United States Patent
Lo et al.

(10) Patent No.: US 7,830,813 B1
(45) Date of Patent: Nov. 9, 2010

(54) TRAFFIC BASED AVAILABILITY ANALYSIS

(75) Inventors: Wing Fai Lo, Plano, TX (US); Bahareh Momken, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1632 days.

(21) Appl. No.: 11/087,200

(22) Filed: Mar. 22, 2005

Related U.S. Application Data

(60) Provisional application No. 60/615,352, filed on Sep. 30, 2004.

(51) Int. Cl.
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl. ............ 370/252; 370/235; 370/254; 709/234; 714/48

(58) Field of Classification Search ......... 370/252–254, 370/216–235; 709/224–234; 714/43–57
See application file for complete search history.

(56) References Cited

U.S. PATENT DOCUMENTS

| 4,009,343 | A | 2/1977 | Markey et al. |
| 5,948,069 | A | 9/1999 | Kitai et al. |
| 6,075,848 | A | 6/2000 | Lunn et al. |
| 6,169,748 | B1 | 1/2001 | Barbas et al. |
| 6,404,769 | B1 | 6/2002 | Kapoor |
| 6,754,843 | B1 | 6/2004 | Lu et al. |
| 6,775,824 | B1 | 8/2004 | Osborne et al. |
| 6,807,156 | B1 * | 10/2004 | Veres et al. ............ 370/252 |
| 6,826,716 | B2 | 11/2004 | Mason |
| 6,885,641 | B1 * | 4/2005 | Chan et al. ............. 370/252 |
| 6,895,578 | B1 | 5/2005 | Kolawa et al. |
| 6,901,051 | B1 * | 5/2005 | Hou et al. ............. 370/231 |
| 6,934,934 | B1 | 8/2005 | Osborne et al. |

(Continued)

OTHER PUBLICATIONS

U.S. Appl. No. 10/671,279, filed Sep. 24, 2003, Callahan et al.

(Continued)

*Primary Examiner*—Man Phan
(74) *Attorney, Agent, or Firm*—Sheridan Ross P.C.

(57) ABSTRACT

A system for analyzing an availability of at least part of a communications network is provided. The network includes a set of network components, that are further divided into first and second subsets of network components. Each of the first and second subsets includes a plurality of different components in the network component set. The system includes an availability prediction assessment tool that is operable to (I) determine a first traffic flow exchanged between first and second endpoint groupings in the first subset, the first traffic flow being a first percentage of a total traffic flow in the communications network; (ii) for a plurality of first subset members involved in the first traffic flow, determine a corresponding downtime; (iii) determine a total of the downtimes corresponding to the plurality of first subset members; (iv) multiply the total of the downtimes by the first percentage to provide a first traffic weighted total downtime for the first subset; and (v) determine an availability of the first subset for the first traffic flow based on the first traffic weighted total downtime for the first subset.

19 Claims, 8 Drawing Sheets

U.S. PATENT DOCUMENTS

| | | | |
|---|---|---|---|
| 6,944,848 B2 | 9/2005 | Hartman et al. | |
| 6,948,153 B2 | 9/2005 | Bowers | |
| 6,965,575 B2 * | 11/2005 | Srikrishna et al. | 370/252 |
| 6,966,048 B2 | 11/2005 | Bowers | |
| 6,968,363 B1 | 11/2005 | Mulvey | |
| 6,968,371 B1 | 11/2005 | Srinivasan | |
| 7,000,224 B1 | 2/2006 | Osborne et al. | |
| 7,054,308 B1 | 5/2006 | Conway | |
| 7,095,732 B1 | 8/2006 | Watson, Jr. | |
| 7,124,401 B2 | 10/2006 | Muller et al. | |
| 7,127,641 B1 | 10/2006 | Anderson | |
| 7,149,226 B2 | 12/2006 | Wolrich et al. | |
| 7,149,917 B2 * | 12/2006 | Huang et al. | 714/4 |
| 7,181,743 B2 | 2/2007 | Werme et al. | |
| 7,185,103 B1 * | 2/2007 | Jain | 709/234 |
| 7,213,179 B2 * | 5/2007 | Song et al | 714/48 |
| 7,236,483 B2 | 6/2007 | Yeom | |
| 7,239,166 B2 | 7/2007 | Braverman et al. | |
| 7,245,922 B2 | 7/2007 | Furuskar et al. | |
| 7,328,428 B2 | 2/2008 | Baugher | |
| 7,523,355 B2 * | 4/2009 | Huang et al. | 714/43 |
| 7,564,793 B2 | 7/2009 | Baldwin et al. | |
| 7,613,474 B2 | 11/2009 | Lee | |
| 2003/0235280 A1 | 12/2003 | Shafie-Khorasani et al. | |
| 2004/0057389 A1 * | 3/2004 | Klotz et al. | 370/252 |
| 2004/0081079 A1 * | 4/2004 | Forest et al. | 370/216 |
| 2004/0160983 A1 | 8/2004 | Kuskin et al. | |
| 2004/0240385 A1 | 12/2004 | Boggs et al. | |
| 2005/0018611 A1 * | 1/2005 | Chan et al. | 370/241 |
| 2006/0146820 A1 | 7/2006 | Friedman et al. | |
| 2007/0286374 A1 | 12/2007 | Romeo | |

OTHER PUBLICATIONS

U.S. Appl. No. 10/944,069, filed Sep. 16, 2004, Lo et al.
White Paper entitled, "IP Telephony: The Five Nines Story," Cisco Systems, Inc. (Aug. 26, 2002), available at http://www.cisco.com/warp/public/cc/so/neso/vvda/iptl/5nine_wp.pdf, 19 pages.
Gary Audin, "Reality Check on Five-Nines," *Business Communications Review* (May 2002), available at http://www.bcr.com/bcrmag/2002/05/p22.php, pp. 22-27.
"LSSGR: Reliability, Section 12, A Module of LSSGR, FR-64," Telcordia Technologies, GR-512-CORE, Issue 2 (Jan. 1998).
Freeman, Roger L., "Chapter 1: Some Basics in Conventional Telephony," *Telecommunication System Engineering*, pp. 1-57.
Gregory V. Wilson, "XML-Based Programming Systems," Doctor Dobb's Journal, pp. 16-24, Mar. 2003.
"Welcome to Superx++ Source!," available at http://xolusplus.sourceforge.net/indexPage.html (Nov. 4, 2002).
"Download XppEngCOM.dll," available at http://xplusplus.sourceforge.net/Downloads/XppEngCOM.html (2002).
"Download XppEngFilt.dll," available at http://xplusplus.sourceforge.net/Downloads/XppEngFilt.html (2002).
"Download XppConsole.exe," available at http://xplusplus.sourceforge.net/Downloads/XppConsole.html (2002).
"Download XppHub.exe," available at http://xplusplus.sourceforge.net/Downloads/XppHub.html (2002).
"Download XppExt.dll," available at http://xplusplus.sourceforge.net/Downloads/XppExt.html (2002).
"Download XppTester.exe," available at http://xplusplus.sourceforge.net/Downloads/XppTester.html (2002).
Dolzer et al. "A simulation study on traffic aggregation in multi-service networks" High Performance Switching and Routing, 2000. ATM 2000. Proceedings of the IEEE Conference on Jun. 26-29, 2000 pp. 157-165.
Bouras et al. "Behaviour investigation using simulation for redundant multicast transmission supporting adaptive QoS" Networks, 2002. ICON 2002. 10th IEEE International Conference on Aug. 27-30, 2002 pp. 112-117.
Fgeel et al. Comparing IPv4 end-to-end QoS capabilities with QoS techniques using RSVP and MPLS: Electrical and Computer Engineering, 2002. IEEE CCECE 2002. Canadian Conference on vol. 3, May 12-15, 2002 pp. 1455-1460 vol. 3.
Walke et al. "IP over wireless mobile ATM-guaranteed wireless QoS by HiperLAN/2" Proceedings of the IEEE; vol. 89, Issue 1, Jan. 2001 pp. 21-40.
Chau et al. "Optimizing call admission control with QoS guarantee in a voice/data integrated cellular network using simulated annealing" Global Telecommunications Conference, 2002. GLOBECOM '02. IEEE, pp. 809-813.

* cited by examiner

TRAFFIC BASED AVAILABILITY ANALYSIS

CROSS REFERENCE TO RELATED APPLICATION

This application claims the benefits under 35 U.S.C. §119 of U.S. Provisional Patent Application Ser. No. 60/615,352, filed on Sep. 30, 2004 entitled "TRAFFIC-BASED AVAILABILITY ANALYSIS", which is incorporated by reference in its entirety herein.

Cross reference is made to U.S. patent application Ser. No. 10/944,069, filed on Sep. 16, 2004 entitled "PROCEDURAL XML-BASED TELEPHONY TRAFFIC FLOW ANALYSIS AND CONFIGURATION TOOL", which is incorporated in its entirety herein by reference.

FIELD OF THE INVENTION

The invention relates generally to telecommunications systems and particularly to traffic-based availability analysis of telecommunications systems.

BACKGROUND OF THE INVENTION

As enterprises accelerate their migration from traditional circuit switched telephony services to Internet Protocol (IP) Telephony solutions, a major consideration is their ongoing concern as to the potential reliability of the proposed IP voice services versus that of their current infrastructure. Indeed, in many call center environments, the potential cost of downtime is often greater than the implied benefits of migrating to IP Telephony. As such, it is often crucial for an enterprise system to meet a certain level of availability (e.g., 99.99% available) for the entire enterprise system or for at least one or more site(s) or subsystem(s) of the system.

The availability of a switching system is traditionally defined as the probability (i.e., percentage of up time) of the time that the system is operational. The availability is generally calculated from an end-user's perspective and does not necessarily reflect the frequency of individual component failures or required maintenance where they do not affect the availability of the overall system to an end-user. The telecommunications industry requires a high degree of rigor, structure and methodologies for determining whether a device or service is operational. The availability of critical components (i.e., critical to call processing) of an IP Telephony system, such as supporting hardware, software and the underlying data network infrastructure is analyzed first. Then, the total system availability is calculated based on the availability of all the components.

The Telecordia (Bellcore) GR-512 Reliability Model requirements for telecommunications equipment, for example, provide one industry standard for determining critical outages and downtime. In this model, the data required for predicting system availability is limited to unplanned outage frequency and downtime experienced by service interruption. Potential outages include Reportable Outages, Outage Downtime Performance Measure and Downtime Measure for Partial Outages. A Reportable Outage comprises an event that includes total loss of origination and termination capability in all switch terminations for at least a 30 second period (uninterrupted duration). An Outage Downtime Performance Measure comprises "the expected long-term average sum, over one operating year, of the time durations of events that prevent a user from requesting or receiving services. A failure that causes service interruption contributes to the Outage Downtime of that service. Outage Downtime is usually expressed in terms of minutes of outage per year." A Downtime Measure for Partial Outages is a Weighted Downtime Performance Measure. "The actual time duration of a partial outage is weighted by the fraction of switch terminations affected by the outage condition."

Thus, the availability of a critical component or subsystem (i.e., critical to call processing) is typically described by the following formula:

$$\text{Availability} = (\text{MTBF} - \text{MTTR})/\text{MTBF}$$

where MTBF represents a Mean Time Between Failure and MTTR represents Mean Time To Recovery/Repair, which corresponds to the time to diagnose, respond and restore service. This equation is also presented in industry literature as the following:

$$\text{Availability} = (\text{MTTF})/(\text{MTTF} + \text{MTTR})$$

where MTTF is defined as a Mean Time to Failure, and equates to (MTBF−MTTR).

Using these formulas, the estimated average annual minutes of downtime experienced due to a critical component or a subsystem failure can be expressed as the following:

$$\text{Annual Downtime Minutes} = (1 - \text{Availability}) \times (525960 \text{ minutes/year}),$$

where the 525960 minutes per year is based upon assuming 365.25 days per year.

For projecting an enterprise's total system availability, the sum of the annual downtime from each of the subsystems or individual critical components (i.e., those components critical to call processing) is calculated, and the system availability is estimated by this sum. Thus, the Total System Availability can be estimated by the following formula:

$$\text{Total System Availability} = 1 - \frac{\sum [i\text{th Subsystem Annual Minute Downtime}]}{525960 \text{ Minutes/Year}}$$

Where downtime affects only a portion of an enterprise's system, the downtime is weighted due to the portion of the system that is affected by the outage. As described above, the calculation of the Downtime Measure for Partial Outages involves weighting the actual time duration of the outage by the fraction of the total switch terminations affected by the outage condition. Thus, this calculation assumes an equal distribution of traffic across the enterprise system's switch terminations. In reality, however, traffic patterns in a telecommunications system can vary widely. A call center, for example, may handle traffic levels orders of magnitude higher than the traffic of another site, such as a branch site of the telecommunications system. In such a network, the assumption of an equal distribution of traffic fails to accurately represent the actual distribution of traffic on the system and thus fails to accurately assess the system availability.

Thus, in predicting the availability of a telecommunications system, it would be desirable to account for the traffic distribution across that system.

SUMMARY OF THE INVENTION

These and other needs are addressed by the embodiments of the present invention. The present invention is generally directed to a system and method for predicting downtime and/or availability of a communications system or subsystem, which considers traffic flow or volume.

In one embodiment of the present invention, a method for analyzing an availability of part or all of a communications network is provided.

The network includes a set of network components that is further divided into first and second subsets. Each of the first and second subsets includes a plurality of different components in the network component set. As will be appreciated, a telecommunications system can be characterized as a set of telecommunications components, such as Local Area Network(s) or LAN('s), media server(s), media gateway(s), router(s), switch(es), IP hardphone(s), IP softphone(s), telephones, router(s), digital signal processor(s), time division multiplexed slot(s), time division multiplex bus(es), trunk(s), port(s), codec(s), transport network(s), control network(s), port network(s) and the like. A system is typically defined by a communications network, and a subsystem is a defined subset of the set of devices in the communications network. Typically, each subset in the system is located within and/or is otherwise associated with a defined geographical area, such as a site, a branch office, and the like.

The method includes the steps of:

(a) determining a first (e.g., intra-subset) traffic flow exchanged between first and second component (e.g., endpoint) groupings in the first subset, the first traffic flow being a first percentage of a total traffic flow in the communications network;

(b) for a plurality of first subset members involved in the first traffic flow, determining a corresponding downtime;

(c) determining a total of the downtimes corresponding to the plurality of first subset members;

(d) multiplying the total of the downtimes by the first traffic flow percentage to provide a first traffic-weighted total downtime for the first subset; and (e) determining an availability of the first subset for the first traffic flow based on the first traffic-weighted total downtime.

The method is an analytical approach for projecting the availability of the communication system's IP telephony solution by examining the characteristics of the critical components of the telephony system and the traffic handled by the components. The availability projection will assist with designing a configuration that will meet the enterprise's reliability expectations. This approach enables availability modeling analysis specifically for each individual enterprise according to the enterprise's IP telephony configuration and the generated telephony traffic within each site, between sites, and the traffic generated on the intermediate data network(s).

Traffic is important to consider for at least two reasons. First, failure in a system, and as a result, the downtime experienced by end users are commonly traffic dependent; in other words, the more traffic a subsystem or a system handles the higher the impact of a failure on service interruption. Second, consideration of traffic volume permits a more accurate assessment of the impact on the network when a failure occurs. In other words, the rerouting of the traffic may not only cause traffic requirements to be unmet but also place a greater burden on other communication components and cause the components to have a greater failure rate/downtime and/or to be capacity exceeded. The present invention can consider the availability/downtime effects from traffic flow rerouting.

The present invention can have a number of advantages in addition to those noted above. For example, the present invention can model traffic flows for availability analysis not only in simple but also in complex geographically distributed networks. Traffic generated at the headquarters of a distributed enterprise network is commonly much higher than traffic at a branch office, which serves mainly local intra-site telephony activities. Predicting the availability of the system based on the traffic usage can assist in designing a customized, minimum-required redundancy configuration to minimize outage minutes in areas experiencing high traffic usage rates, while reducing the likelihood that the degree of system redundancy will be over- or under-engineered due to a failure to appreciate traffic flow patterns and volumes. This ability provides the option of optimizing system redundancy where it is most needed. In computing the critical component or subsystem downtime, the present invention can also consider conventional and reliable analytical parameters, such as Mean Time Between Outages/Failure (MTBO/MTBF) and Mean Time to Recover/Restore (MTTR) service, and the algorithms noted above.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Availability Predictive Architecture

Figure 1:
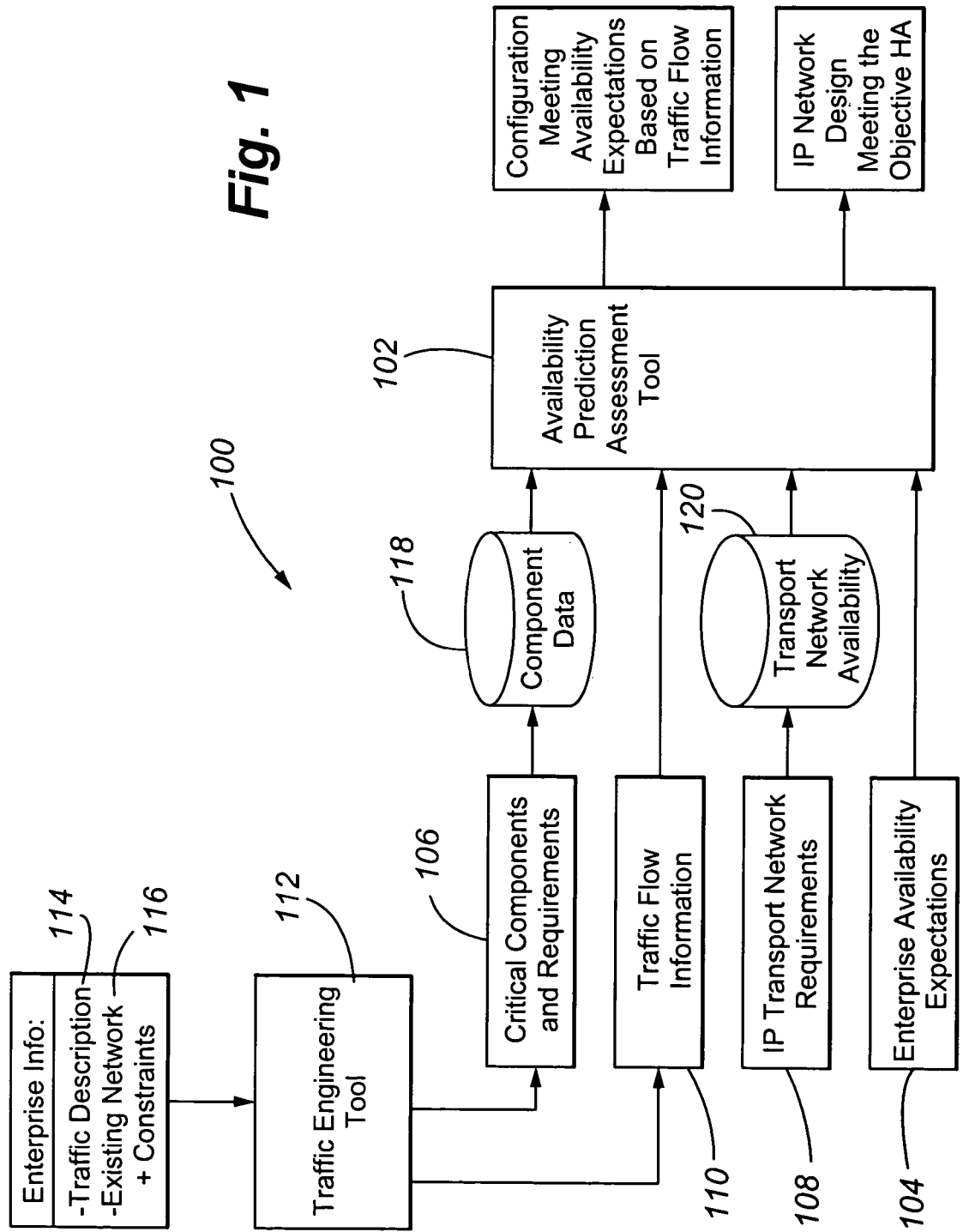
FIG. 1 shows a block diagram of an embodiment of a system for predicting the availability of an IP telephony network.

FIG. 1 shows a block diagram of an embodiment of an availability prediction system 100 comprising an availability prediction tool 102 that utilizes traffic information in a prediction of availability of a telecommunications system or a subsystem thereof.

As shown in FIG. 1, the availability prediction tool 102 receives various inputs such as an (enterprise) availability expectation 104, critical components (i.e., components critical to call processing) and requirements data 106 for the telecommunication system, IP transport network requirements 108, and traffic flow information 110.

The availability expectation 104, for example, may be received from an enterprise, may be imposed by an industry standard, or the like. Typically, an enterprise has an availability expectation for the system in which the system must be available. For example, the enterprise may require an overall availability of 99.9%, 99.99%, 99.999% or the like for the telecommunications system or may require a particular availability for one or more individual site(s) of the system.

The critical components and requirements data 106 for the telecommunication system may be determined based on historical information, may be provided by a component manufacturer or, as shown in FIG. 1, may be determined from a traffic engineering tool 112. One embodiment of such a traffic engineering tool 112, for example, is described in U.S. patent application Ser. No. 10/944,069 entitled "Procedural XML-Based Telephony Traffic Flow Analysis and Configuration Tool" and filed on Sep. 16, 2004, which was previously incorporated by reference. Exemplary critical components and requirements information includes, for each component type (e.g., media server, gateway, port network, IP circuit pack, and the like), the number of components and component requirements necessary to handle the corresponding projected bulk traffic flow.

The traffic engineering tool 112 described in the co-pending application includes a performance modeling and design tool for telecommunications systems, particularly involving IP traffic. The traffic engineering tool 112 determines bulk traffic flows between subsets of components in the telecommunications system. The tool determines bulk traffic flows by identifying communities of interest of components according to defined rules/policies; logically characterizes the network according to a defined model, such as a hierarchical or wire model; based on selected rules such as the Uniform Distribution Model flows bulk traffic through the logical characterization of the network and aggregates traffic at selected points/nodes in the network (which effectively populates a Community of Interest or COI matrix); and, using the accumulated traffic flows at selected nodes and the desired quality or grade of service and suitable mathematical equations, determines recommended resource requirements (e.g., component requirements). The communities of interest can be grouped by physical and/or network location and/or type of endpoint (e.g., circuit- or packet-switched). Typically, the COI matrix provides traffic usage rate according to a number of sites, number of users and user's traffic characteristics.

The availability prediction tool 102 also receives IP transport network requirements 108, which reflect the types of traffic loads (e.g., realtime loads such as VoIP traffic, non-realtime loads such as instant messaging, email, and traffic having noncommunication data payloads, and the like) on the differing IP data networks (e.g., LAN and WAN network components). These requirements, for example, may be received from the enterprise currently operating an IP data network (e.g., based on historical data or load predictions for the IP data network). Examples of such requirements include network topology, network components and protocols, which provide high performance and fast convergence following a device or link failure, Quality of Service or QoS metrics, such as jitter and packet loss, for voice communications. Other types of traffic have the same and/or other differing transmission requirements.

Finally, the availability prediction tool 102 receives traffic flow information 110. The traffic flow information 110, in the embodiment shown in FIG. 1, is commonly received from the traffic engineering tool 112. The traffic flow information 110 may alternatively or additionally be determined from monitoring actual usage or from historical traffic data or via any other method of collecting traffic flow information known in the art.

In the embodiment shown in FIG. 1, for example, the traffic engineering tool 112 receives traffic description information 114 and existing network and constraints information 116 for the system. The traffic engineering tool 112 determines traffic flow information 110 (e.g., a Community of Interest (COI) table) and major components and requirements data 106 for the telecommunications system.

In the embodiment of FIG. 1, the major components and requirements data 106 is mapped to a component-specific availability table or database 118, and the IP transport network requirements data is mapped to a transport network availability table or database 120. The outputs of the mapping operations are provided to the availability prediction tool 102. The information in the availability tables includes availability information, such as Mean Time Between Failures or MTBF, Mean Time to Recover/Repair or MTTR, Mean Time to Failure or MTTF, Failure in Time Rate or FIT, Mean Time between Outages or MTBO, failure rate, reportable outage(s), outage downtime measure(s), downtime measure for partial outage(s), and/or other availability or reliability information for various types of components and/or networks. This information is typically collected over long periods through experience.

The availability prediction tool 102 receives input information and uses the information to predict an availability for an entire enterprise system or for one or more subsystem(s) of the enterprise system.

The Operation of the Architecture

Figure 2:
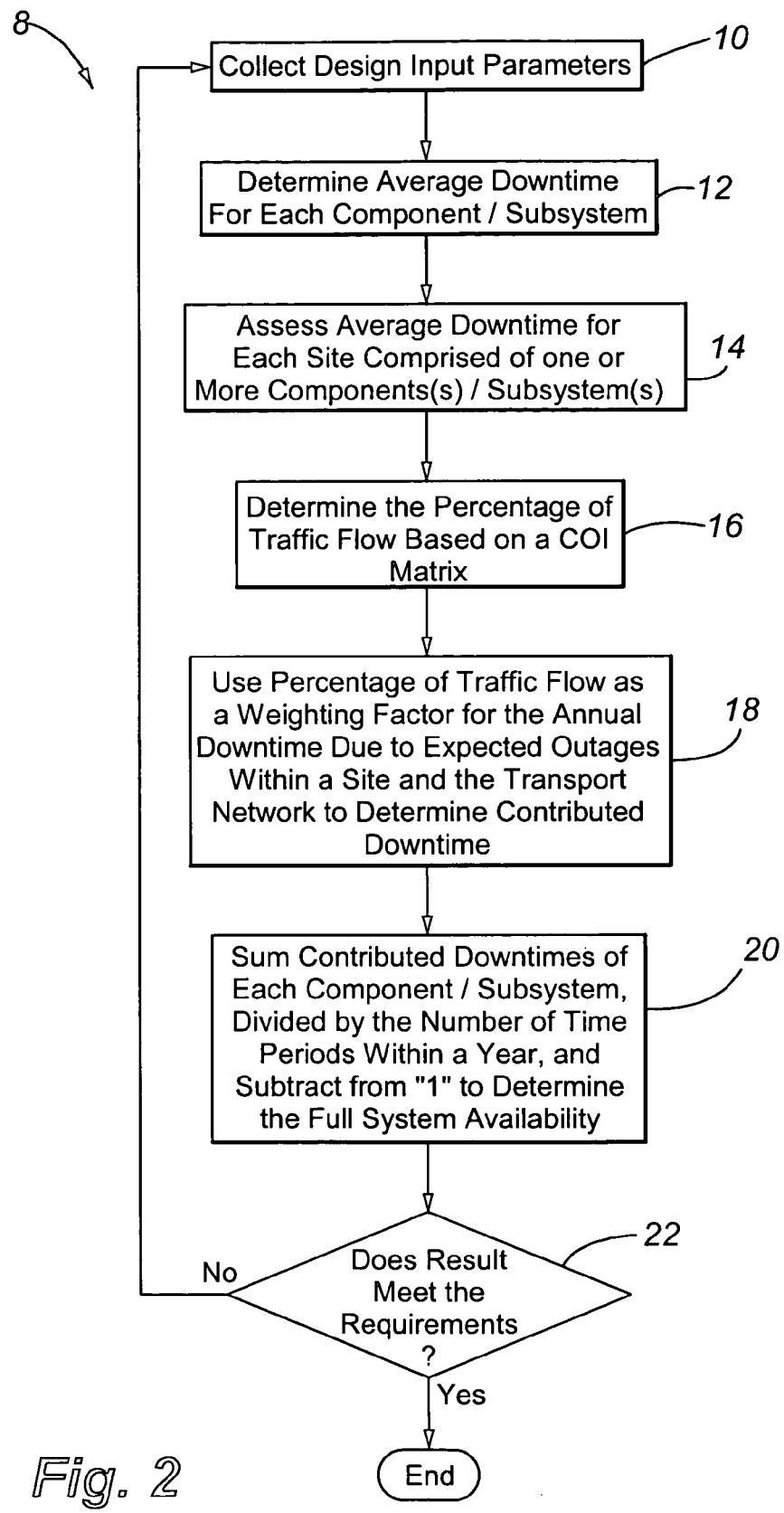
FIG. 2 shows a flow diagram of an embodiment of a process for predicting an availability of an IP telephony network that may be used within the availability prediction tool of FIG. 1.

FIG. 2, for example, shows a flow diagram of one embodiment of a method 8 utilized by the availability prediction tool 102 for determining a traffic-based availability of a telecommunications system. As shown in FIG. 2, design input parameters (the various inputs described above) are collected in operation 10.

In operation 12, an average downtime is determined over a selected time period (e.g., in minutes per hour or minutes per year) due to an outage of a component, network, or subsystem thereof by a suitable technique, such as using MTBF/MTBO and MTTR data for each component of the network and conventional mathematical equations, including those described above. The average downtime may comprise a ratio of a unit of time to a unit of time, such as minutes per hour or minutes per year. Although conventional MTBF/MTBO and MTTR analyses may be used within the scope of the invention, other analysis methods may also be used.

In one configuration, for example, the availability of a component can be expressed by the following formula: Availability=(MTBF−MTTR)/MTBF, where MTBF represents Mean Time Between Failures and MTTR represents Mean Time To Recover/Repair. MTTR corresponds to the time required to diagnose, respond and resume service. Alternatively, the availability of the component may also be expressed, as known in the art, by the following formula: Availability=(MTTF)/(MTTF+MTTR), where MTTF represents the Mean Time To Failure and corresponds to (MTBF−MTTR). Using the first equation, the estimated average annual minutes of downtime experienced due to failure of the component can be expressed as follows:

Annual Downtime Minutes=(1−Availability)×(525960 minutes per year), where the 52690 minutes per year is based upon assuming 365.25 days in a year. Alternatively, to determine the downtime in minutes per hour, the formula may be (1−Availability)×(60 minutes per hour).

In one configuration, Mean Time Between Failure (MTBF) and Failure In Time (FIT) rate data (e.g., FIT in one hour=1/MTBF) of individual components or subsystems are based on the Telecordia recommended "Part Count Method." This method predicts a component (e.g., circuit pack) failure rate by summing failure rates of all the devices on the component. See, e.g., Telecordia (Bellcore) GR-512, Requirement R3-1, Hardware Reliability Modeling Methods, Section 3.1. When extended field performance data is available for a component or subsystem (typically based upon a review of two (2) years of marketplace performance in a variety of settings for numerous enterprises), a statistical estimate based on combining the empirical data and predicted data of the Part Count Method is used for the component or subsystem MTBF.

For measuring the failure rate of the components that are working in parallel, either in standby/active mode or active/active mode, a Markov Chain Model (also known as a State-Space Model) can be used. A state-transition diagram of the Markov model displays the possible combinations of "up" and "down" states for each component. Evaluation of the model along with the failure rates and repair/recovery leads to an estimation of steady-state probabilities and failure rates.

Figure 3:
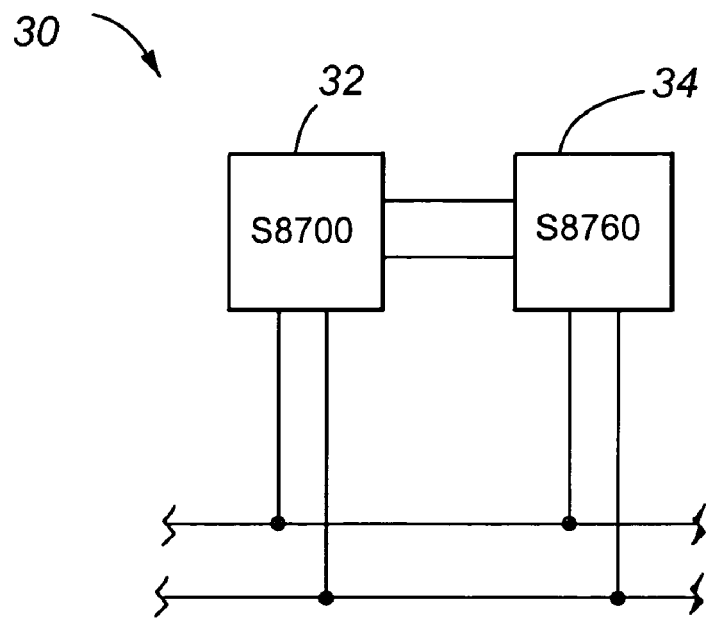
FIG. 3 shows a block diagram of a network configuration in which duplex servers can be configured to operate in an active/standby mode.
Figure 4:
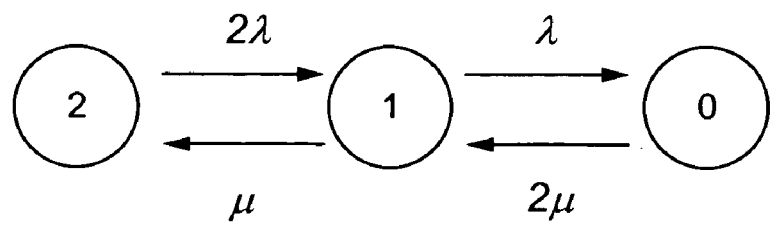
FIG. 4 shows a Markov state transition diagram for assessing a duplex server MTBF for the network configuration shown in FIG. 3.

FIG. 3, for example, shows an embodiment of a network configuration 30 in which duplex servers 32 and 34, which can be configured to operate in an active/standby mode. In one embodiment, for example, the servers 32 and 34 may comprise duplex Avaya S8700 Media Servers. FIG. 4 further shows a Markov state-transition diagram for the network configuration 30 shown in FIG. 3. In FIG. 4, State 2 represents both servers operating. State 1 represents one of the two servers operating, and State 0 represents neither of the servers operating. The parameter $\lambda$ represents the average failure rate expressed in failures per hour ($\lambda$=FIT in an hour=1/MTBF) of an individual server. The parameter $\mu$ represents the average repair rate expressed in repairs per hour of an individual server, and it is reciprocal of MTTR ($\mu$=1/MTTR). A critical outage occurs when both servers 32 and 34 are down, and thus the failure arrival rate for the network 34 as a whole is the rate at which transitions from State 1 to State 0 occur. This failure rate is calculated according to the following formula: $F=\lambda \times P_1$, wherein $P_1$ is the probability of being in State 1 and is defined as: $P_1 = (2 \times \lambda \times \mu)/(\mu^2 + 2 \times \lambda \times \mu + \lambda^2)$.

The following table shows the result of a calculation of a failure for the network configuration 30 in which the servers 32 and 34 comprise duplex Avaya Inc.'s S8700 servers operating in active/standby mode. As shown in Table 1, the Mean Time Between Failure (MTBF) of the two servers operating in active/standby mode is shown in Hours. In order to assess this number for this example, a 4 hour Mean Time To Repair (MTTR) is assumed. According to the Telcordia GR-512 Core, an Equipment Service Restoral Time will take approximately a total of three (3) hours of service restoral time for attended sites (those with onsite technical resources), and four (4) hours of service restoral time for unattended sites (those sites to which technical resources must be summoned).

TABLE 1

Downtime perceived by enterprise due to redundancy in an Avaya S8700 Duplex Server Complex

| Component/Sub-System | MTBF | Component Availability | Annual Downtime Minutes |
|---|---|---|---|
| Single S8700 Media Server | 52,815 hours | 99.992% when MTTR = 4 hours | 42 minutes |
| Redundant S8700 Media Servers | 3.487 × 10⁸ hours | 99.9999 + % when MTTR = 4 hours | <=0.53 minutes |

Where the network configuration 30 is implemented with duplex servers 32 and 34 operating in an active/active mode (e.g., Power Supply devices in an Avaya G650 Media Gateway), however, the Markov state-transition model changes. In this scenario, upon the failure of one component, the parallel component is required to carry twice the original load. This, for example, may be estimated to correspond to an approximate doubling of the Failure rate. In this embodiment, the increased failure rate may be captured by substituting 2$\lambda$ for the failure transition rate from State 1 to State 0.

Returning again to FIG. 2, an average annual downtime (e.g., in minutes) is next summed for each identified subset or subcollection of components or subsystem in the enterprise network in operation 14. In this operation, the average annual downtime for each type of component is associated with the subset or subsets in which the component is included. Stated another way, for each component in each subset the respective downtime is associated with that component in that subset. The total average annual downtime for each subset is then determined as the sum of the annual downtimes for all of the members of the subset.

For each subset of components, a percentage of traffic flow based on a COI matrix is calculated in operation 16. The traffic flow for each subset of components includes the internal traffic between the components in the subset, the external traffic between the components in the subset and components in other subsets, and the traffic over intermediate networks.

In operation 18, the percentages calculated in operation 16 are used as weighting factors for the total annual downtimes for each set. Operation 18 determines the contributed annual downtime due to expected outages within a subset of components and the transport network by multiplying the total downtime for each subset by the appropriate percentage of total enterprise traffic handled by components in that subset.

For example, consider a configuration with a remote media gateway in a branch office generating approximately 10% of the total enterprise traffic. Upon failure of the media gateway serving the branch office, the contributed downtime of the gateway being off-line to the total system downtime is estimated as follows:

ith Subsystem Contributed Downtime=Remote Media Gateway Downtime×(10%+10%×90%)

The weighting factor of 10% corresponds to the portion of end users that will lose service due to a failure within the media gateway, and the weighting factor of 10%×90% corresponds to the rest of the enterprise end users not being able to make calls that terminate into the failed media gateway in the branch office. In one embodiment, as described below, the weighting factor(s) may be calculated using the COI matrix determined by the traffic engineering tool 112.

In operation 20, the weighted or contributed downtimes of each subset of components (or of each component/subsystem) are summed to determine the total enterprise annual downtime (e.g., in minutes) and divided by the number of time units within a year to determine a downtime percentage of annual operating. The downtime percentage is subtracted from 1 to determine the full system or enterprise availability. For example, the system or enterprise availability may be determined using this following formula:

$$\text{Total System Availability} = 1 - \frac{\sum (i\text{th Subsystem Annual Downtime Minutes}) \times (T_i)}{525960 \text{ minutes per year}}$$

here $T_i$ comprises the traffic flow factor for the ith subsystem. Further, the Total System Availability can also be represented as:

$$1 - \frac{\sum (i\text{th Subsystem Contributed Downtime Minutes})}{525960 \text{ minutes per year}}$$

where the Subsystem Contributed Downtime minutes represent the Subsystem Annual Downtime Minutes weighted by the traffic factor $T_i$. Alternatively, as described above, the denominator of 52960 minutes per year may be replaced by 60 minutes per hour to determine the availability in terms of minutes per hour.

When projecting the availability of a network (e.g., an IP telephony system), both hardware and software downtime contributions can be considered. Then, the impact of network failure can also be estimated. In one embodiment, for example, the full system availability may be assessed based upon the sum of the downtime minutes experienced due to a component or subsystem failure on a path from point A to point B and the fraction of traffic of the overall system that traverses that path.

Alternatively, the full system availability may be approximated by multiplying the individual availability calculated for each component or subset of the system. This approach is a simplification of the algorithm described above and results in a close approximation of the full system availability. As described above, an availability of each subset is calculated by the following formula:

$$SubsetAvailability(j) = 1 - \frac{SD(j)}{525960}$$

where SD(j) represents the subset annual contributed downtime minutes described above.

The products of the availabilities of N subsets is shown in the following formulas:

$$\prod_{j=1}^{N} SubsetAvailability(j) = \prod_{j=1}^{N}\left(1 - \frac{Sd(j)}{525960}\right) = 1 - \sum_{j=1}^{N}\frac{SD(j)}{525960} + M$$

-continued $$\left\{\prod_{j=1}^{N} SubsetAvailability(j)\right\} - \left\{1 - \sum_{j=1}^{N}\frac{SD(j)}{535960}\right\} = M$$

where M represents the difference between the formula described above and the approximation (i.e., the error introduced by the approximation). The order of M is represented as follows:

$$O(M) \leq O\left(\frac{\text{Max}\{SD(j); j = 1, N\}}{525960}\right)^2$$

Since the numerator of the fraction is small relative to the denominator, M comprises a very small positive number. An example of a calculation using this approximation is shown below with respect to Case Study IV of Example 2.

Finally, in operation 22, the result of operation 20 is compared to the availability requirements for the proposed network (e.g., an enterprise's expectations or demands). If the proposed network meets the availability requirements, the proposed network may be selected (or identified as a viable option). If the system fails to meet the availability expectations, the proposed network may be rejected or altered (e.g., through one or more added redundancies). If the system is rejected, the method 8 may be re-iterated with a new network or with an altered proposed network. In addition, where the new network or the altered proposed network is significantly changed in a manner that would alter the traffic flows of the network, the network may also be re-analyzed by the traffic engineering tool 112 to determine new data for the network that is to be used in the availability prediction tool 102 in the next iteration.

EXAMPLES

Example 1

Figure 5:
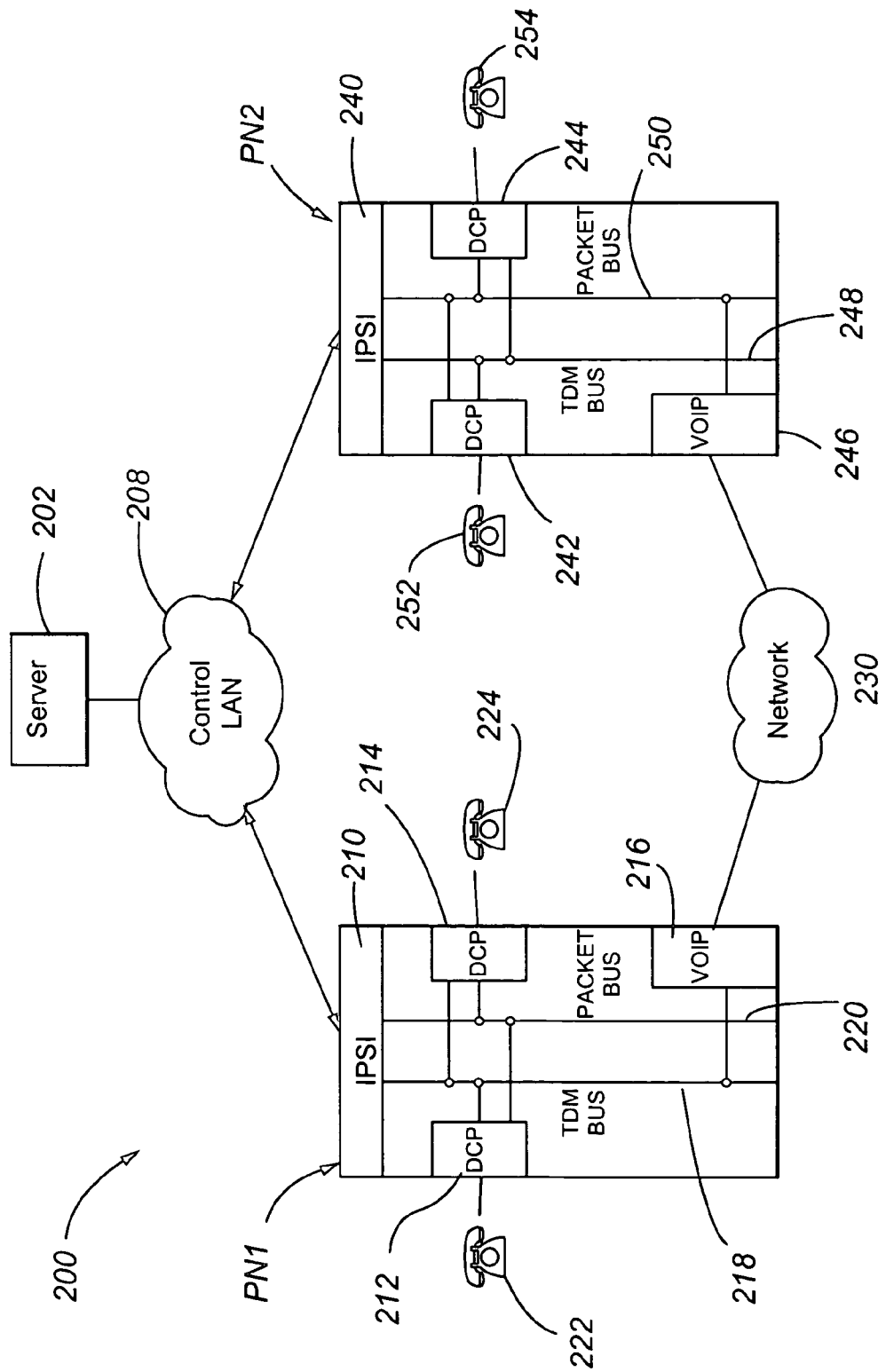
FIG. 5 shows a block diagram of an exemplary single-site IP telephony network that may be analyzed to predict the availability of the network according to the present invention.

FIG. 5 shows a first example of a telecommunications system 200 for which the availability may be predicted according to the present invention. In this example, the telecommunications system 200 comprises a server 202. The server 202 controls two port networks PN1 and PN2 through a Control Local Area Network (Control LAN) 208 and, in the example shown, includes an Avaya S8500_ Media Server, although other telecommunications servers may be used. The Control LAN 208 is connected to a first port network PN1 and a second port network PN2. In this example, the first and second port networks PN1 and PN2 each comprise an Avaya G650_ Port Network, and the traffic flow comprises (Digital Control Processor) DCP-DCP station-to-station traffic only. The first port network PN1 includes 240 DCP stations, and the second port network PN2 includes 480 DCP stations.

At the first site, a first port network PN1 includes an IP Server Interface (IPSI) card 210, a first DCP card 212, a second DCP card 214, and a voice over IP (VoIP) card 216. The cards 210, 212, 214 and 216 are connected via a time division multiplexing (TDM) bus 218 and a packet bus 220. The DCP cards 212 and 214 are each connected to one or more endpoints, such as telephones 222 and 224. The VoIP card 216 is further connected to a network 230, such as an enterprise local area network (LAN) or a wide area network (WAN).

At the second site, a second port network PN2 comprises an IPSI card 240, a pair of DCP cards 242 and 244 and a VoIP card 246. The cards 240, 242, 244 and 246 are connected via a TDM bus 248 and a packet bus 250. The DCP cards 242 and 244 are each connected to an endpoint, such as telephones 252 and 254. The VoIP card 246 is further connected to the network 230 and, via the network 230, to the VoIP card 216 of the first port network PN1.

In this example, an intra-port network call may be placed from a first telephone 222 connected to the first DCP card 212 in the first port network PN1 to a second telephone 224 connected to the second DCP card 214. When the call is placed from the first telephone 222, a control signal is sent via the TDM bus 218 to the IPSI card 210. The IPSI card 210 communicates with the server 202 via the Control LAN 208. The server 202 determines the location of the destination of the call and, in the case of an intra-port network call, determines that the destination telephone 224 is connected to a DCP card in the first port network PN1, such as the DCP card 214. The server 202 then instructs the destination telephone 224 to begin ringing via the Control LAN 208, IPSI card 210, TDM bus 218 and the DCP card 214. The talk path is also established from the source telephone 222 to the first DCP card 212 to the TDM bus 218 to the second DCP card 214 from which it is connected to the destination telephone 224.

In an inter-port network call, the call is placed from a source telephone 222 connected to the first port network PN1 to a destination telephone 254 connected to the second port network PN2. As described above with respect to the intra-port network call, a request for call set up is sent via the TDM bus 218 to the IPSI card 210. The IPSI card 210 communicates with the server 202 via the Control LAN 208. The server 202 determines the location of the destination telephone and, in the case of an inter-port network call, determines that the destination telephone 254 is connected to a DCP card in the second port network PN2, such as the DCP card 244. The server 202 then instructs the destination telephone 254 connected to the second port network PN2 to begin ringing via the Control LAN 208, the IPSI card 240, the TDM bus 248 and the DCP card 244 in the second port network PN2. A talk path is also established from the source telephone 222 to the first DCP card 212 to the TDM bus 218 to the VoIP card 216 to the network 230 to the second VoIP card 246 in the second port network PN2 to the TDM bus 248 in the second port network PN2 to a DCP card 244 from which it is connected to the destination telephone 254.

To predict an availability for this system 200, the system 200 is analyzed by the traffic engineering tool (described in application Ser. No. 10/944,069 filed on Sep. 16, 2004). The output of the traffic engineering tool provides a COI matrix of traffic flow information as shown in Table 2.

TABLE 2

Distribution of Traffic
(total generated traffic within the system = 199.98 Erlangs)

|  | Port Network PN1 | Port Network PN2 |
|---|---|---|
| Port Network PN1 | 22.22 Erlangs | 44.44 Erlangs |
| Port Network PN2 | 44.44 Erlangs | 88.88 Erlangs |

As shown in Table 2, the intra-port network traffic for the first port network PN1 is predicted to be 22.22 Erlangs, and the intra-port network traffic for the second port network PN2 is predicted to be 88.88 Erlangs. The inter-port network traffic flow between the first port network PN1, and the second port network PN2 is predicted to be 44.44 Erlangs. This traffic flow information corresponds to the "Traffic Flow Information" 110 shown as an output of the traffic engineering tool 112 in FIG. 1.

The traffic engineering tool also provides a second set of output information showing the components involved within a call flow for the system 200. Table 3 shows the output of the traffic engineering tool identifying the components involved within intra-port and inter-port call flows for the system 200.

TABLE 3

|  | Port Network PN1 | Port Network PN2 |
|---|---|---|
| Port Network PN1 | IPSI, Server, Control LAN, 2 × DCP card, TDM bus, Port Network support components (e.g., fans and power supply) | 2 × IPSI, Server, Control LAN, 2 × DCP card, 2 × TDM bus, 2 × VoIP, LAN, 2 × Port Network support components (e.g., fans and power supply) |
| Port Network PN2 | 2 × IPSI, Server, Control LAN, 2 × DCP card, 2 × TDM bus, 2 × VoIP, LAN, 2 × Port Network support components (e.g., fans and power supply) | IPSI, Server, Control LAN, 2 × DCP card, TDM bus, Port Network support components (e.g., fans and power supply) |

Table 3 shows the components involved in a call flow for intra-port network calls in the first port network PN1 and intra-port network calls in the second port network PN2. Table 3 further shows the components involved in a call flow for an inter-port network call between the first and second port networks PN1 and PN2. This data corresponds to the "Major Components and Requirements" information 106 shown as an output to the traffic engineering tool 112 in FIG. 1. As shown in FIG. 1, this information is used in a mapping step to identify component data, such as the MTBF/MTBO and MTTR data, for the individual components identified as impacting the call flow of the system 200. This MTBF/MTBO and MTTR data is then used in operation 12 to determine the average downtime minutes per hour for each component as shown in Table 4.

TABLE 4

| Component | MTBF (hrs) | Failure Rate (hrs) | Availability | Annual Downtime Minutes | Average Downtime Minutes per Hour |
|---|---|---|---|---|---|
| S8500 Server |  |  | 0.9999 | 52.6 | 0.006 |
| IPSI | 306810 | 3.25935E−06 | 0.999987 | 6.8 | 0.0008 |
| VoIP Card | 701280 | 1.42596E−06 | 0.999994 | 3 | 0.0003 |
| DCP Circuit Pack | 672264.54 | 1.48751E−06 | 0.999994 | 3 | 0.0003 |
| Chassis Support Components |  |  | 0.999981 | 10 | 0.001 |

In addition to receiving inputs from the traffic engineering tool 112, the embodiment of the availability prediction tool 102 shown in FIG. 1 further receives other input information. For example, the availability prediction tool receives an availability expectation (e.g., from the enterprise or from an industry standard) and a transport network availability. As shown in FIG. 1, for example, the availability expectation is received from an enterprise, which comprises a minimum level of acceptable availability for the system 200.

Transport network components and requirements are identified from the enterprise's transport network. The enterprise's transport network, for example, may comprise a LAN, a WAN, the Internet and/or any other network for carrying traffic. The transport network components and requirements identified for the particular transport network 230. In the embodiment shown in FIG. 1, for example, the transport network components and requirements are mapped to a table to obtain a transport network availability as known in the art. The transport network availability is determined based upon the availability of the components as well as other availability considerations. Where a WAN of an Internet service provider (ISP) is used for the transport network 230, for example, the availability of the transport network 230 may be received from the ISP. The availability of the transport network may also be determined from historical data and/or predicted according to known network availability determinations. For the purposes of this example, the transport network availability is assumed to be 99.995% for the Control LAN 208 and 99.9% for the transport network 230.

The average annual downtime minutes is then be determined for the subsets of network components in operation 14. The subsets of network components are port network 1 or PN1 (which corresponds to a first site) and port network 2 or PN2 (which corresponds to a second site). Since, in this example, the traffic usage rate is given as the average generated traffic per busy hour, the annual downtime minutes for each component/subsystem is converted to downtime minutes per hour by dividing each number by 8766, the number of hours in a year (assuming 365.25 days per year). As described with reference to operation 16 of FIG. 2, the percentage of intra-site, inter-site, and over the data network traffic is calculated based on the traffic flow of the COI matrix shown above in Table 2, which in this embodiment was received from the traffic engineering tool 112. For intra-port network calls within the first port network PN1, the following formula may be used to determine the down time in minutes/hour:

Downtime Minutes/Hour=[IPSI Down Time+Server
Down Time+Control LAN Down Time+2×DCP
Down Time+TDM Bus Down Time+PN Support
Components Down Time]×(22.22/199.98)
Erlangs=0.001295 min/hr.

In this formula, the Down Time values for the individual components are found in column 6 of Table 4 ("Average Downtime Minutes/Hour"). Based on this down time calculation, the availability of the system 200 for intra-port network calls within the first port network PN1 is calculated by the following:

Availability=1−(0.001295/60)=0.999978, or 99.9978%.

For the intra-port network calls within the second port network PN2, the following formula may be used to determine the down time in minutes/hour:

Downtime Minutes/Hour=[IPSI Down Time+Server
Down Time+Control LAN Down Time+2×DCP
Down Time+TDM Down Time+PN Support
Components Down Time]×(88.88/199.98)
Erlangs=0.004664 min/hr.

Again, the Down Time values for the individual components are found in column 6 of Table 4 ("Average Downtime Minutes/Hour"). Based on this down time calculation, the availability of the system 4 for intra-port network calls within the second port network PN2 is calculated by the following:

Availability=1−(0.004664/60)=0.99992 or 99.9922%.

Finally, the availability of the system for inter-port network calls between the first and second port networks PN1 and PN2 is calculated (operation 18) by using the following formula to determine the down time in minutes/hour:

Downtime Minutes/Hour=[2×IPSI Down Time+
Server Down Time+Control LAN Down Time+
2×DCP Down Time+2×TDM Bus Down Time+
2×VoIP Down Time+Network Down Time+2×
PN Support Components Down Time]×(2×44.44/
199.98) Erlangs=0.009012 min/hr.

Again, the Down Time values for the individual components are found in column 6 of Table 4 ("Average Downtime Minutes/Hour"). Based on this down time calculation, the availability of the system 200 for inter-port network calls between the first and second port networks PN1 and PN2 is calculated (operation 18) by the following:

Availability=1−(0.009012/60)=0.99985 or 99.985%.

For a site availability calculation, it is assumed that a site must be able to make and receive calls (both intra-site and inter-site) to be available. In this example, the site availability for each site is calculated as follows.

Site 1 (first port network *PN*1)=1−[(0.001295+
0.009012)/60]=0.99982 or 99.982%

Site 2 (second port network *PN*2)=1−[(0.004664+
0.009012)]=0.999772 or 99.9772%

For the full system availability (operation 20), the Full System Availability=1−[(0.001295+0.004664+0.009012)/60]=0.99975 or 99.975%.

Example 2

Figure 6:
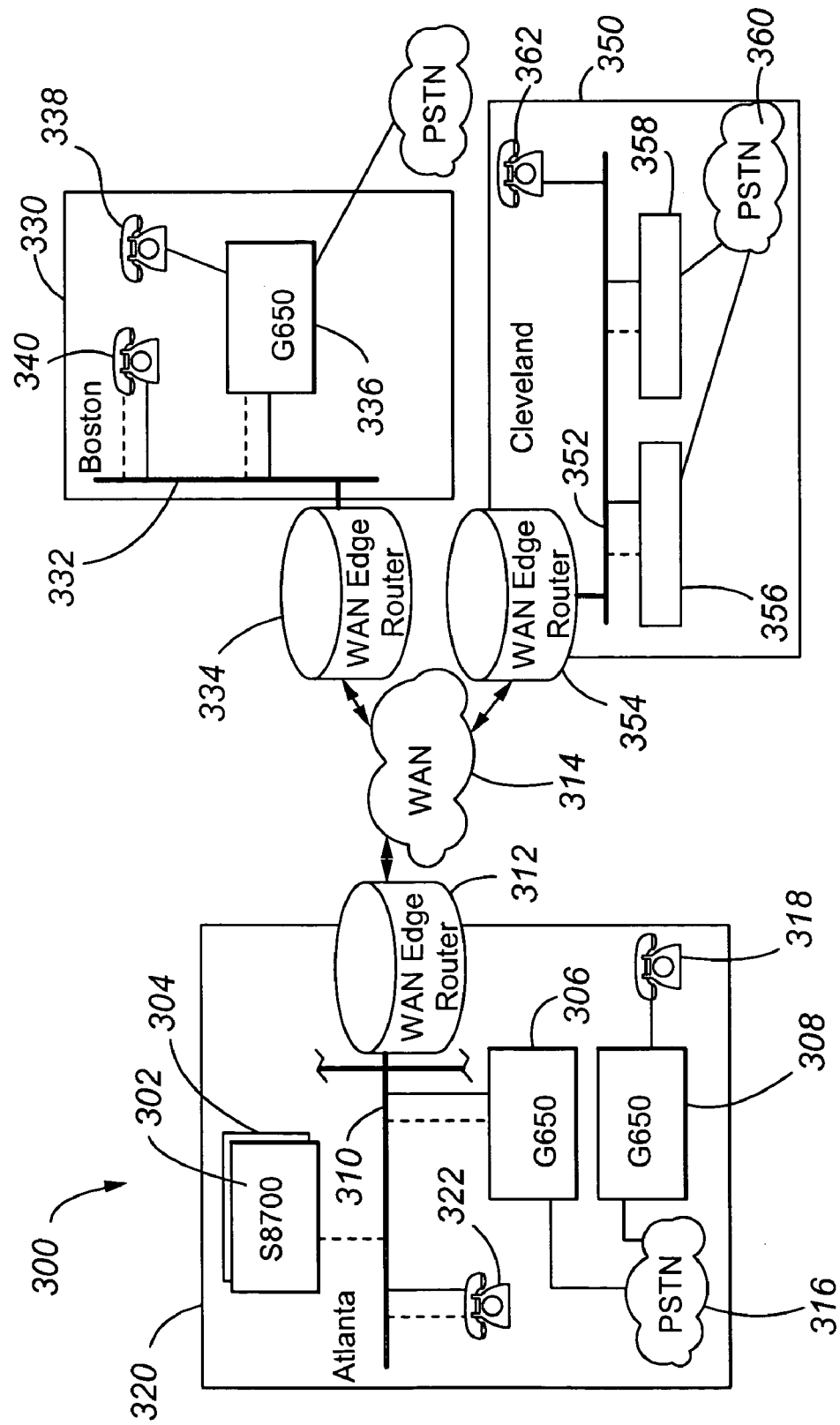
FIG. 6 shows a block diagram of another exemplary geographically distributed IP telephony network that may be analyzed to predict the availability of the network according to the present invention.

FIG. 6 shows a first example of a geographically distributed network 300. As shown in FIG. 6, an Avaya S8700_ IP-Connect System has a pair of S8700 media servers 302 and 304, and a pair of port networks 306 and 308 (e.g., two Avaya G650 media gateways) connected by a LAN 310 located in a headquarters site 320 in Atlanta. The LAN 310 is further connected to a WAN router 312 connected to a WAN 314. The port networks 306 and 308 are connected to a public switching telephone network (PSTN) 316 and are further connected to one or more communities of local telephone(s) 318 located within the Atlanta headquarters site 320. In addition, one or more communities of local telephone(s) 322 are connected to the LAN 310. A branch office site 330 in Boston also includes a LAN 332 that is connected to the WAN 314 via a WAN router 334. The Boston site 330 further includes a port network 336 (e.g., an Avaya G650 media gateway) connected to the LAN 332 and one or more communities of local telephone (s) 338. The Boston site 330 also includes one or more communities of local telephone(s) 340 connected directly to the Boston LAN 332. A third site 350 located in a branch office in Cleveland is also connected to the system 300 via the WAN 314. The Cleveland site 350 comprises a LAN 352 connected to the WAN 314 via a WAN router 354. Two media gateways 356 and 358 (e.g. Avaya G700_ media gateways) are connected to the Cleveland LAN 352 and are further connected to a PSTN 360. Communities of local telephones 362 are also connected directly to the LAN 352. The link between the media servers 302 and 304 and the port networks 306 and 308 at the headquarters site 320 traverses the Atlanta LAN 310 and an IPSI on each port network. The links between the media servers 302 and 304 located in the Atlanta site 320 and two the remote sites 330 and 350 traverse the WAN 314.

For the purpose of assessing full system availability, the percentage of traffic generated at each site serves as a prorating factor for the downtime expected as the result of a failure at that site. The percentage of traffic generated at each site is calculated from the Communities of Interest (COI) matrix generated by a traffic engineering tool as described above. For the purposes of this example, the percentage of traffic for the example shown in FIG. 6 is shown in the COI matrix of Table 5.

TABLE 5

Percentage of Traffic Generated by Each Site Calculated Based on Traffic COI Matrices. Total Traffic Generated = 226 Erlangs

|  | Inbound & Outbound | Atlanta Site | Boston Site | Cleveland Site |
|---|---|---|---|---|
| Atlanta Site | 98E => 43.3% | 32E => 14.2% | 12E => 5.2% | 5E => 2.2% |
| Boston Site | 36E => 16% | 12E => 5.2% | 4E => 2% | 2E => 0.9% |
| Cleveland Site | 16E => 7% | 6E => 2.7% | 2E => 0.9% | 1E => 0.4% |

Case Study I

In a first case study for the network 300 shown in FIG. 6, the call processing link from the S8700™ media servers 302 and 304 to the G650™ media gateways 306 and 308 in the Atlanta headquarters site 320 is supported by a single LAN connection 310. In addition, the call processing link from the servers to each of the branch offices is over a single WAN link 314. The quality of the Control LAN and media processor circuit packs or media modules are designed to support the calculated traffic load and have not been engineered with N+1 reliability.

The single WAN link is the weakest link in this configuration. Because WAN facilities are usually leased, and because of the cost-prohibitive nature of procuring WAN circuits, WAN availability has historically been in the range from 99% to 99.5%, although some service providers currently guarantee 99.9% availability per WAN circuit. The call control signaling traffic traverses the WAN link to give service to the phones in Boston and Cleveland. As a result the availability of these two sites is no greater than the availability of the WAN link. Table 6 and Table 7 show the result of a subset of components availability analysis for this configuration.

TABLE 6

Case Study I: Site Down Time Minutes and Impact of WAN Outages on Each Site.

| | Hardware Components | | Enterprise Solution including LAN and WAN Links | |
|---|---|---|---|---|
| Site | Availability | Annual Downtime (Minutes) | Availability | Per Site Annual Downtime Minutes |
| Atlanta | 99.95% | 263 | 99.95% | 263 |
| Boston | 99.95% | 263 | 99% | 5260 (88 hrs) |
| Cleveland | 99.95% | 263 | 99% | 5260 (88 hrs) |

The site availability values listed in the first column of Table 6 represent the availability of the hardware components (e.g., the Avaya S8700 media servers). The site availability values listed in column three of Table 6, however, include the impact of the enterprise's data network availability on each site's availability. The combined value is assessed by considering the components involved to complete a call from point A to point B. For example, for calls generated in Boston the following components are involved: servers in Atlanta 302 and 304, control signaling over the Atlanta LAN connection 310, the WAN link 314 between Boston and Atlanta, the Boston LAN connection 332 and the G650 media gateway 336 in Boston.

TABLE 7

Example of Boston Communication System Availability Calculation

| Component | Availability | Annual Downtime Minutes |
|---|---|---|
| S8700 Servers in Atlanta | 99.9995% | 2.6 |
| Data Network between Atlanta and Boston | 99% to 99.5% | 2630 to 5260 |
| Boston Media Gateway | 99.95% | 262.98 |
| Aggregated | 98% to 99.4% | 3155.76 (2.6 + 2630 + 262.98) to 7863 (2.6 + 5260 + 262.98) |

A similar approach is taken to assess the availability in Atlanta and Cleveland. Annual downtime minutes are calculated for each site and the transport network. Then, the traffic factor is multiplied by the annual downtime minutes. The result is aggregated to assess the full system availability as shown in Table 8.

TABLE 8

| Full Solution Availability Projected | Weighted Downtime (Minutes) |
|---|---|
| % of traffic generated in Atlanta × annual downtime minutes in Atlanta | (43.3% + 14.2%) × 263 = 151 |
| % of traffic generated in Boston × annual downtime minutes in Boston | (16% + 2%) × 5260 = 947 |
| % of traffic between Atlanta and Boston × annual downtime minutes in Atlanta, WAN and Boston | (5.2% + 5.2%) × 5260 = 547 |
| % of traffic generated in Cleveland × annual downtime minutes in Cleveland | (7% + 0.4%) × 5260 = 390 |
| % of traffic between Atlanta and Cleveland × annual downtime minutes in Atlanta, WAN and Cleveland | (2.7% + 2.2%) × 5260 = 258 |
| % of traffic between Boston and Cleveland × annual downtime minutes in Boston, WAN and Cleveland | (0.9% + 0.9%) × 5260 = 95 |
| Aggregated Downtime | 2388 minutes (151 + 947 + 547 + 390 + 258 + 95) |
| System Availability = 1-(2388/525960) = 99.5% | |

As reflected in Table 8 shown above, the main availability bottleneck for this configuration comprises the single WAN link supporting the call control signaling between the headquarters and either of the branch offices.

Case Study II (99.8% Availability)

Figure 7:
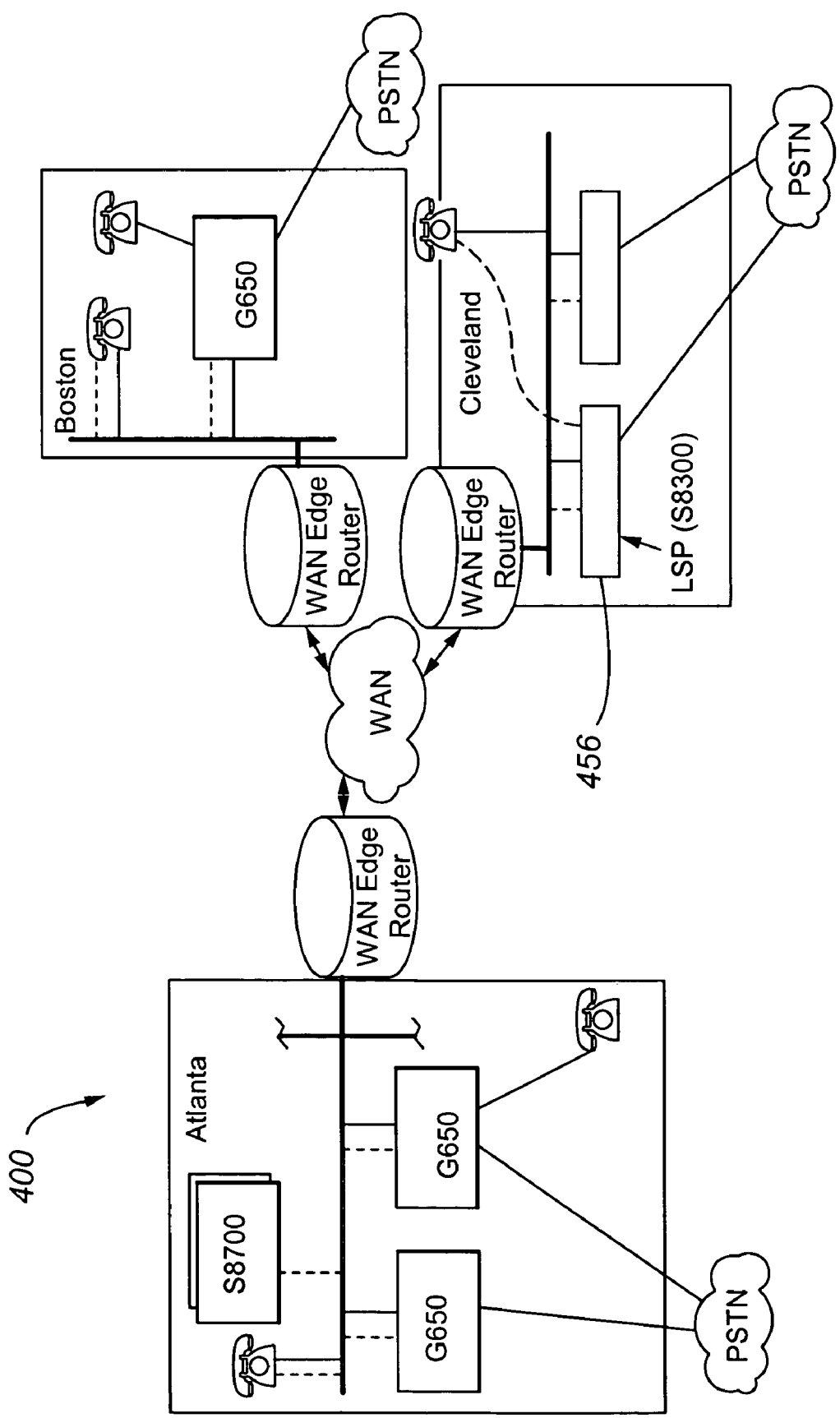
FIG. 7 shows a block diagram of yet another exemplary geographically distributed IP telephony network that may be analyzed to predict the availability of the network according to the present invention.

Case Study II demonstrates the effect of a Local Survivable (Spare) Processor (LSP) 456 on system 400 to improve the local availability for the branch offices as shown in FIG. 7. The Cleveland site 350 is equipped with an LSP as an alternate gatekeeper and call controller for the IP phones and the G700 Media Gateways 356 and 358 located in the Cleveland site. As a result, the call processing signaling traffic has a higher availability in the Cleveland office. In addition, the Atlanta site 320 IP traffic is enhanced by implementation of N+1 IP resources. The IPSI circuit packs, C-LAN circuit packs and media processing circuit packs in Atlanta are implemented using N+1 resources. For example, the call control link can be distributed to the port networks (e.g., the Avaya G650_ media gateways) over two IP links, supported by two IPSI circuit packs, and increasing the number of C-LAN circuit packs by one will provide extra IP resources for IP-phone signaling messages. Such a distribution of resources allows for IP telephone service availability in the event of a link or device failure. This configuration also improves the availability of the circuit-switched telephony traffic on this site because only half of the circuit-switched telephony located in the Atlanta site is affected by an IPSI failure. With the addition of an additional port network, however, there will be increased loads on the media processor circuit packs, as they now must support the inter-port network traffic generated by the circuit-switched endpoints. As a result the traffic engineering tool should be re-applied to this configuration to determine the required number of media processor circuit packs. In addition to re-applying the traffic engineering tool 112 to determine component set-up, re-applying the traffic engineering tool 112 to the redesigned system would also re-calculate the traffic flow information for the system 400 in order to make the prediction even more accurate. Although this has not been done in this example, it would be possible to calculate new traffic flow information for the revised system 400.

As shown in Tables 9 and 10, the highest downtime is contributed by the WAN link between the headquarters in Atlanta and the two branch offices.

TABLE 9

Case Study II: Standard Configuration Availability and Impact of WAN Outages on Each Site

| | Hardware Components | | Enterprise Solution including LAN and WAN Links | |
|---|---|---|---|---|
| Site | Availability | Annual Downtime (Minutes) | Availability | Per Site Annual Downtime Minutes |
| Atlanta | 99.99% | 53 | 99.99% | 53 (4.3 hrs) |
| Boston | 99.95% | 263 | 99% | 5260 (88 hrs) |
| Cleveland | 99.99% | 53 | 99.99% | 53 (4.3 hrs) |

TABLE 10

| Full Solution Availability Projected | Weighted Downtime (Minutes) |
|---|---|
| % of traffic generated in Atlanta × annual downtime minutes in Atlanta | (43.3% + 14.2%) × 53 = 30.5 |
| % of traffic generated in Boston × annual downtime minutes in Boston | (16% + 2%) × 5260 = 947 |
| % of traffic between Atlanta and Boston × annual downtime minutes in Atlanta, WAN and Boston | (5.2% + 5.2%) × 5260 = 547 |
| % of traffic generated in Cleveland × annual downtime minutes in Cleveland | (7% + 0.4%) × 53 = 4 |
| % of traffic between Atlanta and Cleveland × annual downtime minutes in Atlanta, WAN and Cleveland | (2.7% + 2.2%) × 5260 = 258 |
| % of traffic between Boston and Cleveland × annual downtime minutes in Boston, WAN and Cleveland | (0.9% + 0.9%) × 5260 = 95 |
| Aggregated Downtime | 1874.5 minutes (30.5 + 940 + 547 + 4 + 258 + 95) |
| System Availability = 99.6% | |

Case Study III (99.98% Availability)

Figure 8:
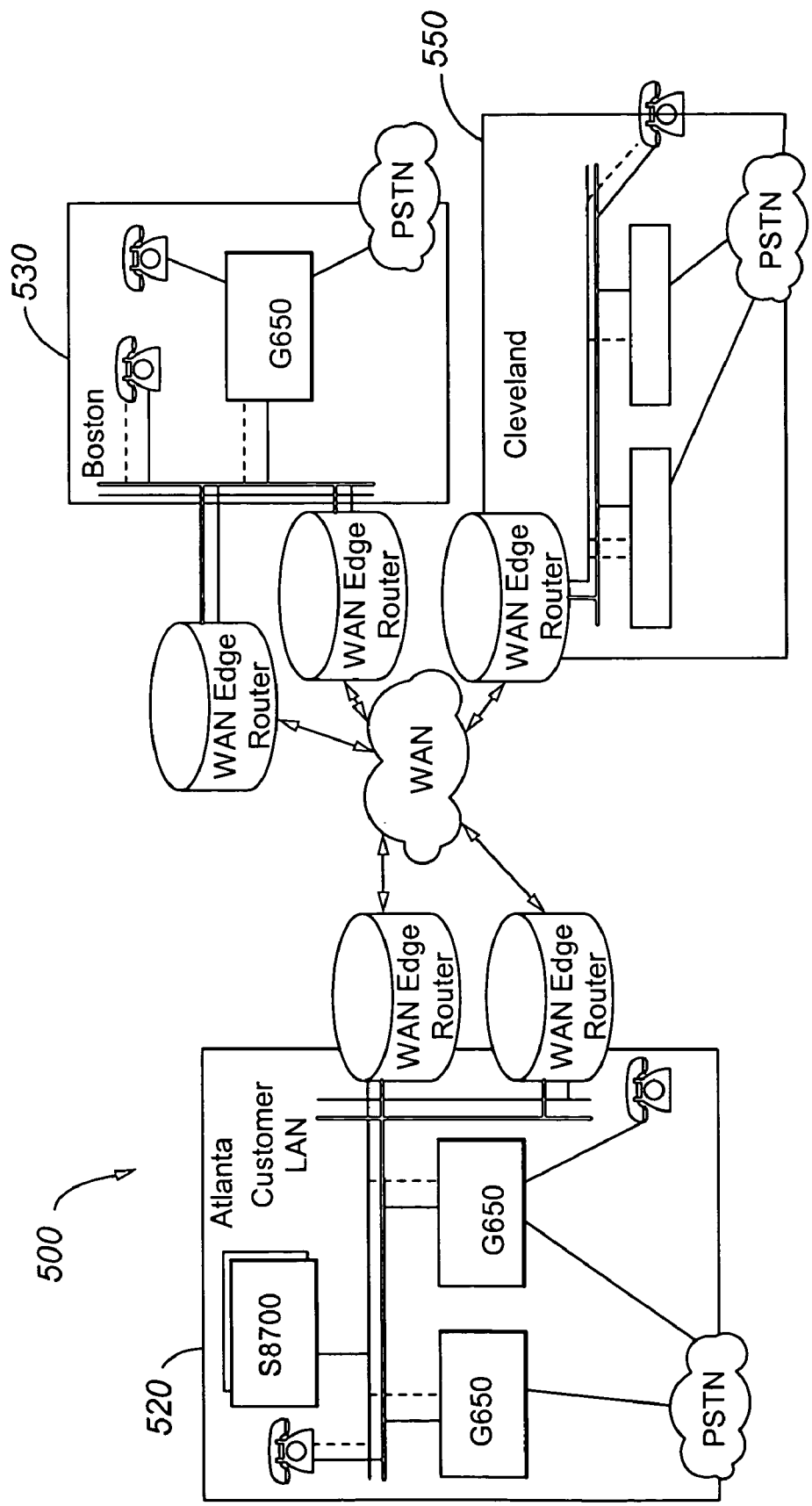
FIG. 8 shows a block diagram of another exemplary geographically distributed IP telephony network that may be analyzed to predict the availability of the network according to the present invention.

Case study III shows a further adjustment of the systems shown in FIGS. 6 and 7 in order to reach a higher availability. As shown in FIG. 8, the system 500 implements the following redundancies in system:

N+1 resources in each site (e.g., the number of C-LAN circuit packs and media processor circuit packs in Atlanta 500 and Boston 530. In Cleveland 550, each media gateway contains a resident VoIP resource, and each media gateway 356 and 358 has the capacity of housing an extra VoIP media module.

Redundant WAN links are present and properly configured to converge rapidly in the event of an outage.

Signaling and media traffic may take different routes across the system.

IP phones have at least three valid gatekeeper addresses that do not depend on the same WAN link In this configuration, the redundant WAN link has an availability range of 99.9% to 99.99%. In the Atlanta headquarter site 520, the N+1 IPSI and the N+1 C-LAN resources will provide sufficient IP resources in the event of a single C-LAN or IPSI failure. Table 11 shows the improved local availability values for the branch offices 530 and 550 due to the additional redundancies added in system 500.

TABLE 11

Case Study III

| | Hardware Components | | Enterprise Solution including LAN and WAN Links | |
|---|---|---|---|---|
| Site | Availability | Annual Downtime (Minutes) | Availability | Per Site Annual Downtime Minutes |
| Atlanta | 99.99% | 53 | 99.99% | 53 (4.3 hrs) |
| Boston | 99.95% | 263 | 99% | 5260 (88 hrs) |
| Cleveland | 99.99% | 53 | 99.99% | 53 (4.3 hrs) |

TABLE 12

| Full Solution Availability Projected | Weighted Downtime (Minutes) |
|---|---|
| % of traffic generated in Atlanta × annual downtime minutes in Atlanta | (43.3% + 14.2%) × 26.3 = 15 |
| % of traffic generated in Boston × annual downtime minutes in Boston | (16% + 2%) × 53 = 9.5 |
| % of traffic between Atlanta and Boston × annual downtime minutes in Atlanta, WAN and Boston | (5.2% + 5.2%) × 263 = 27 |
| % of traffic generated in Cleveland × annual downtime minutes in Cleveland | (7% + 0.4%) × 53 = 0.75 |
| % of traffic between Atlanta and Cleveland × annual downtime minutes in Atlanta, WAN and Cleveland | (2.7% + 2.2%) × 263 = 47 |
| % of traffic between Boston and Cleveland × annual downtime minutes in Boston, WAN and Cleveland | (0.9% + 0.9%) × 563 = 13 |
| Aggregated Downtime | 112.25 minutes (15 + 9.5 + 27 + 0.75 + 47 + 13) |
| System Availability = 99.98% | |

Case Study IV (99.999% Availability in ATLANTA, 99.99% Full System Availability)

Figure 9:
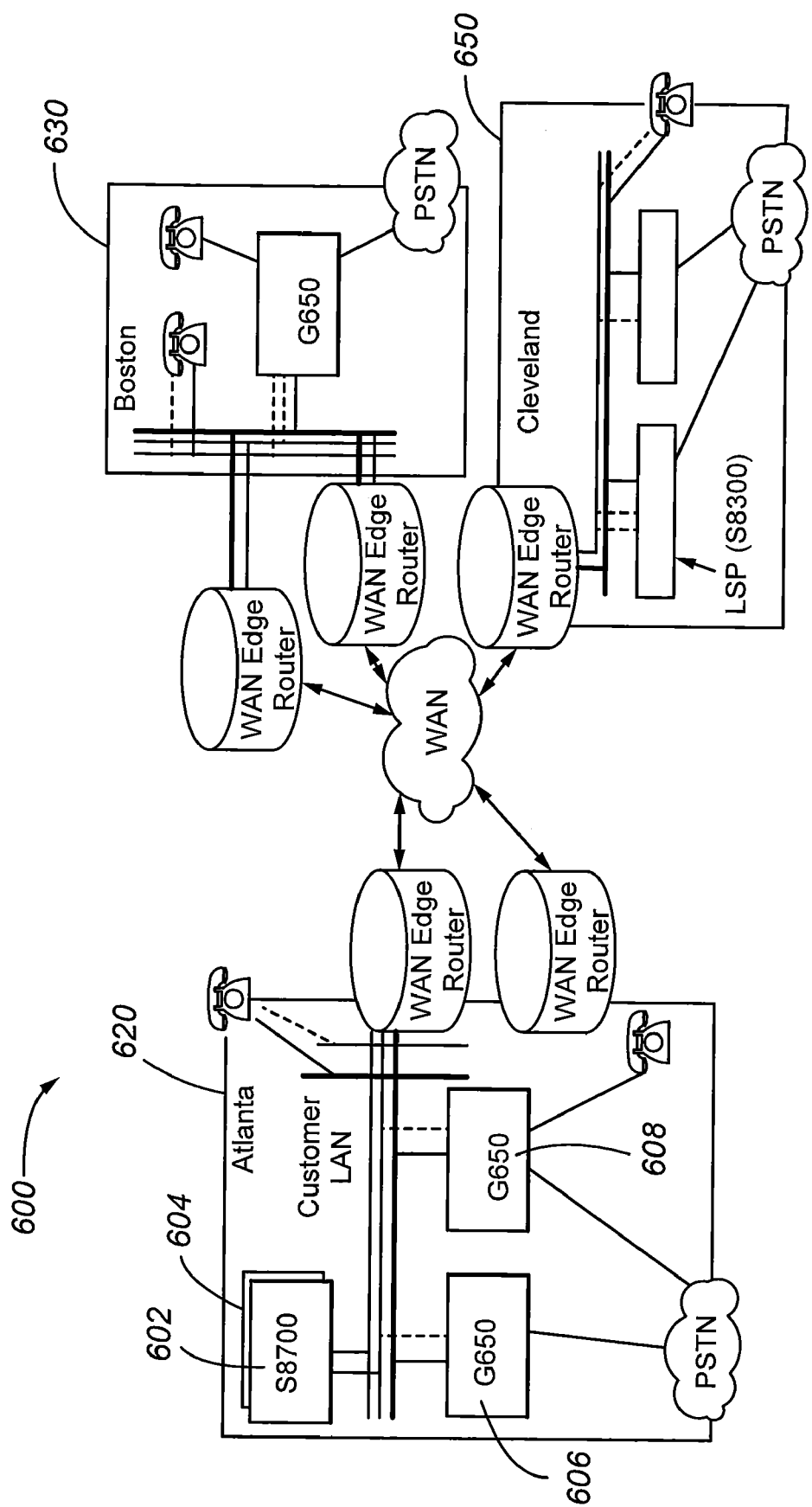
FIG. 9 shows a block diagram of yet another exemplary geographically distributed IP telephony network that may be analyzed to predict the availability of the network according to the present invention.

Case study IV shows a further adjustment of the systems shown in FIGS. 6, 7 and 8 in order to reach an even higher availability for the system 600. As shown in FIG. 9, the system 600 implements the following additional redundancies in system:

Media gateway (e.g., an Avaya G650) with redundant IPSI resources in the Atlanta site 620 and in the Cleveland site 650.

An LSP as an alternate gatekeeper and call controller in the Cleveland site 650.

A fully redundant data network is used to take advantage of the duplicated link connection between media servers and media gateways. The WAN path, when recalculated using redundant circuits should be at least 99.999% available. In addition, each link is expected to have sufficient bandwidth to handle the full load of converged traffic.

For the purposes of this example, the Control LAN between the servers 602 and 604 and the IPSI resources of the media gateways 606 and 608 have been engineered to meet 99.999% availability. Table 13 shows the improved local availability values for the branch offices 630 and 650 due to the additional redundancies added in system 600.

TABLE 13

Case Study IV

| Site | Hardware Components Availability | Annual Downtime (Minutes) | Enterprise Solution including LAN and WAN Links Availability | Per Site Annual Downtime Minutes |
|---|---|---|---|---|
| Atlanta | 99.999% | 5.3 | 99.999% | 5.3 |
| Boston | 99.997% | 15.8 | 99.995% | 26 |
| Cleveland | 99.99% | 53 | 99.989% | 59 |

TABLE 14

| Full Solution Availability Projected | Weighted Downtime (Minutes) |
|---|---|
| % of traffic generated in Atlanta × annual downtime minutes in Atlanta | (43.3% + 14.2%) × 5.3 = 3 |
| % of traffic generated in Boston × annual downtime minutes in Boston | (16% + 2%) × 26 = 4.7 |
| % of traffic between Atlanta and Boston × annual downtime minutes in Atlanta, WAN and Boston | (5.2% + 5.2%) × 26.3 = 2.7 |
| % of traffic generated in Cleveland × annual downtime minutes in Cleveland | (7% + 0.4%) × 59 = 4.4 |
| % of traffic between Atlanta and Cleveland × annual downtime minutes in Atlanta, WAN and Cleveland | (2.7% + 2.2%) × 26.3 = 1.3 |
| % of traffic between Boston and Cleveland × annual downtime minutes in Boston, WAN and Cleveland | (0.9% + 0.9%) × 26.3 = 0.48 |
| Aggregated Downtime | 16.58 minutes (3 + 4.7 + 2.7 + 4.4 + 1.3 + 0.48) |
| System Availability = 99.9968% | |

As reflected in the case studies, an IP telephony solution can be configured to meet an enterprise's desired level of availability. As shown, increased redundancy levels and optimized network design may be used to increase the availability of an IP telephony solution. For a geographically distributed system, for example, a major bottleneck comprises a WAN. For enterprises utilizing such a WAN for high levels of inter-site traffic, redundant WAN links may significantly enhance the full system availability. Such redundancies provide additional bandwidth to support additional traffic in the event of a failure. In order to take full advantage of the redundancy, the network is preferably designed with failure detection, multiple paths and failover capabilities.

In each of the case studies detailed above with respect to Example 2, the contributed annual downtime from each site and the contributed annual downtime from a transport network connecting the sites of a geographically distributed communications network are added together to determine the full system availability of the distributed communications network. As described above, however, an alternative approach for approximating the availability of the distributed communications network comprises multiplying the calculated availability of subsets of the communications network. After determining the contributed downtime associated with each subset (e.g., a site) and between subsets, based upon the downtime and traffic flow associated with components of the subset, the availability of each subset is determined as described above. Then, the availability of each subset is multiplied together to approximate the full system availability.

As shown above with respect to Case Study IV, the subsets of the communications network may comprise an Atlanta site, a Boston site, a Cleveland site, communication between the Atlanta and Boston sites, communication between the Atlanta and Cleveland sites and communication between the Boston and Cleveland sites. The availability of each of these sites, calculated above, are shown below.

Atlanta site availability=[1−(3/525960)]=0.999994
Boston site availability=[1−(4.7/525960)]=0.99999
Cleveland site availability=[1−(4.4/525960)]=0.99999
availability between Atlanta and Boston=[1−(2.7/525960)]=0.999995
availability between Atlanta and Cleveland=[1−(1.3/525960)]=0.999997
availability between Boston and Cleveland=[1−(0.48/525960)]=0.999999

In order to approximate the full system availability for this communications network, the site availabilities may be multiplied together. Thus, the full system availability=0.999994×0.99999×0.99999×0.999995×0.999997×0.999999=0.999965 or 99.9965%. As can be seen by comparing this result to the result shown in Table 14 for Case Study IV, the approximation of 0.999965 is very close to the result of 0.999968 (from Table 14) and results in an error of only 0.000003 or 3×E(−6).

A number of variations and modifications of the invention can be used. It would be possible to provide for some features of the invention without providing others.

For example in one alternative embodiment, the availability prediction assessment tool may be implemented in software, hardware (e.g., a logic circuit such as an Application Specific Integrated Circuit), or a combination thereof.

In another alternative embodiment, the present invention can be applied to networks other than packet-switched networks, such as circuit-switched networks.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for analyzing an availability of at least part of a communications network, the network including a set of network components, the network component set being further divided into at least first and second subsets of network components, and each of the first and second subsets comprising a plurality of different components in the network component set, comprising:
   (a) determining a first traffic flow associated with the first subset;
   (b) determining a second traffic flow associated with the second subset, the first and second traffic flows being unequal;
   (c) determining a first downtime associated with the first subset, wherein the first downtime is derived from at least one of Mean Time Between Failures, Mean Time to Recover/Repair, Mean Time to Failure, Failure in Time Rate, Mean Time between Outages, failure rate, a reportable outage, an outage downtime measure, and a downtime measure for a partial outage;
   (d) determining a second downtime associated with the second subset, wherein the first downtime is derived from at least one of Mean Time Between Failures, Mean Time to Recover/Repair, Mean Time to Failure, Failure in Time Rate, Mean Time between Outages, failure rate, a reportable outage, an outage downtime measure, and a downtime measure for a partial outage; and
   (e) determining a future availability for the network component set, wherein the future availability is a function of the first downtime and first traffic flow and the second downtime and second traffic flow.

2. The method of claim 1, wherein the network component set forms a multi-site enterprise network, wherein the first subset is associated with a first site of the enterprise network, and the second subset is associated with a second site of the enterprise network, and wherein the first traffic flow comprises intra-site traffic flows between members of the first subset and inter-site traffic flows between a member of the first subset and a member of the second subset.

3. The method of claim 1, wherein the first and second subsets each comprise communication endpoints and wherein the first traffic flow is at least one of generated and received by communication endpoints in the first subset and the second traffic flow is at least one of generated and received by communication endpoints in the second subset.

4. The method of claim 3, wherein each of the first and second subsets further comprise a plurality of a switch, router, digital signal processor, gateway resource, time division multiplex bus, trunk, port, codec, transport network, control network, and port network.

5. The method of claim 1, wherein the availability is a function of the sum of the first downtime weighted by the first traffic flow and the second downtime weighted by the second traffic flow.

6. The method of claim 1, wherein the determining step (a) comprises the substep of:
   assigning a plurality of first endpoints in the first subset to a first endpoint grouping;
   assigning a plurality of second endpoints in the first subset to a second endpoint grouping;
   assigning a plurality of third endpoints in the second subset to a third endpoint grouping;
   assigning a plurality of fourth endpoints in the second subset to a fourth endpoint grouping, the first, second, third, and fourth endpoints being different from one another, wherein the first traffic flow comprises traffic exchanged between the first and second endpoints and between each of the first and second endpoints on the one hand and each of the third and fourth endpoints on the other and the second traffic flow comprises traffic exchanged between the third and fourth endpoints and between each of the third and fourth endpoints on the one hand and each of the first and second endpoints on the other.

7. The method of claim 1, wherein the determining step (c) comprises the substep of:
   for each member of the first subset, mapping the member to an availability table to determine availability information for the respective member, wherein the first downtime is derived from the availability information for each of the members of the first subset.

8. The method of claim 7, determining step (c) comprises the substep of: for each member of the first subset, deriving from the corresponding availability information a member downtime, wherein the first downtime is the sum of the individual member downtimes associated with the first subset.

9. The method of claim 1, further comprising:
   (f) determining a third downtime for a transport network connecting the first and second subsets.

10. A method for analyzing an availability of at least part of a communications network, the network including a set of network components, the network component set being further divided into at least first and second subsets of network components, and each of the first and second subsets comprising a plurality of different components in the network component set, comprising:
   (a) determining a first traffic flow exchanged between first and second endpoint groupings in the first subset, the first traffic flow being a first percentage of a total traffic flow in the communications network;
   (b) for a plurality of first subset members involved in the first traffic flow, determining a corresponding downtime, wherein the first downtime is derived from at least one of Mean Time Between Failures, Mean Time to Recover/Repair, Mean Time to Failure, Failure in Time Rate, Mean Time between Outages, failure rate, a reportable outage, an outage downtime measure, and a downtime measure for a partial outage;
   (c) determining a total of the downtimes corresponding to the plurality of first subset members;
   (d) multiplying the total of the downtimes by the first percentage to provide a first traffic weighted total downtime for the first subset; and
   (e) determining a future availability of the first subset for the first traffic flow based on the first traffic weighted total downtime for the first subset.

11. The method of claim 10, wherein the first subset members comprise first and second endpoint groupings, the first traffic flow represents intra-subset traffic flow for the first subset, and wherein the first traffic weighted total downtime is associated with intra-subset traffic, and further comprising:
  (f) determining an inter-subset traffic flow exchanged between at least one of the first and second endpoint groupings in the first subset on the one hand and third and fourth endpoint groupings in the second subset on the other, the inter-subset traffic flow being a second percentage of the total traffic flow in the network;
  (g) for a plurality of the first and second subset members involved in the inter-subset traffic flow, determining a corresponding downtime; and
  (h) multiplying the total of the downtimes of step (g) by the second percentage to provide a second traffic weighted total downtime for inter-subset traffic;
  (I) determining an availability of members in the first and second subsets for inter-subset traffic based on the second traffic weighted total downtime for inter-subset traffic; and
  (j) determining an availability of the communications network by multiplying the availability for inter-subset traffic and the availability for intra-subset traffic.

12. The method of claim 10, wherein the intra-subset and inter-subset traffic flows are unequal.

13. The method of claim 11, further comprising:
  (k) determining an availability of the members of the second subset for intra-subset traffic in the second subset, wherein in step (j) the availability of the communications network is determined by multiplying the availability for inter-subset traffic, the availability for intra-subset traffic in the first subset, and the availability for intra-subset traffic in the second subset.

14. The method of claim 11, wherein in step (g) for a plurality of the first and second subset members involved in the inter-subset traffic comprises endpoints in the first and second subsets and an intermediate network component interconnecting the endpoints in the first and second subsets.

15. A system for analyzing an availability of at least part of a communications network, the network including a set of network components, the network component set being further divided into at least first and second subsets of network components, and each of the first and second subsets comprising a plurality of different components in the network component set, comprising:
  an availability prediction assessment tool operable to (I) determine a first traffic flow exchanged between first and second endpoint groupings in the first subset, the first traffic flow being a first percentage of a total traffic flow in the communications network; (ii) for a plurality of first subset members involved in the first traffic flow, determine a corresponding downtime, wherein the first downtime is derived from at least one of Mean Time Between Failures, Mean Time to Recover/Repair, Mean Time to Failure, Failure in Time Rate, Mean Time between Outages, failure rate, a reportable outage, an outage downtime measure, and a downtime measure for a partial outage; (iii) determine a total of the downtimes corresponding to the plurality of first subset members; (iv) multiply the total of the downtimes by the first percentage to provide a first traffic weighted total downtime for the first subset; and (v) determine a future availability of the first subset for the first traffic flow based on the first traffic weighted total downtime for the first subset.

16. The system of claim 15, wherein the first subset members comprise first and second endpoint groupings, the first traffic flow represents intra-subset traffic flow for the first subset, and wherein the first traffic weighted total downtime is associated with intra-subset traffic, and wherein the tool is further operable to (vi) determine an inter-subset traffic flow exchanged between at least one of the first and second endpoint groupings in the first subset on the one hand and third and fourth endpoint groupings in the second subset on the other, the inter-subset traffic flow being a second percentage of the total traffic flow in the network; (vii) for a plurality of the first and second subset members involved in the inter-subset traffic flow, determine a corresponding downtime; (viii) multiply the total of the downtimes of operation (viii) by the second percentage to provide a second traffic weighted total downtime for inter-subset traffic; (ix) determining an availability of members in the first and second subsets for inter-subset traffic based on the second traffic weighted total downtime for inter-subset traffic; and (x) determine an availability of the communications network by multiplying the availability for inter-subset traffic and the availability for intra-subset traffic.

17. The system of claim 15, wherein the intra-subset and inter-subset traffic flows are unequal.

18. The system of claim 16, wherein the tool is further operable to (xi) determine an availability of the members of the second subset for intra-subset traffic in the second subset, wherein in operation (x) the availability of the communications network is determined by multiplying the availability for inter-subset traffic, the availability for intra-subset traffic in the first subset, and the availability for intra-subset traffic in the second subset.

19. The system of claim 16, wherein in operation (vii) for a plurality of the first and second subset members involved in the inter-subset traffic comprises endpoints in the first and second subsets and an intermediate network component interconnecting the endpoints in the first and second subsets.

* * * * *

UNITED STATES PATENT AND TRADEMARK OFFICE
CERTIFICATE OF CORRECTION

| | | |
|---|---|---|
| PATENT NO. | : 7,830,813 B1 | Page 1 of 1 |
| APPLICATION NO. | : 11/087200 | |
| DATED | : November 9, 2010 | |
| INVENTOR(S) | : Lo et al. | |

It is certified that error appears in the above-identified patent and that said Letters Patent is hereby corrected as shown below:

In Claim 1
Column 21,
Line 39, delete "first downtime" and insert -- second downtime -- therefore.

Signed and Sealed this
Fifteenth Day of March, 2011

David J. Kappos
*Director of the United States Patent and Trademark Office*